United States Patent [19]
Harris et al.

[11] Patent Number: 5,480,696
[45] Date of Patent: Jan. 2, 1996

[54] SILICA POWDERS FOR POWDER EVACUATED THERMAL INSULATING PANEL AND METHOD

[75] Inventors: Michael T. Harris, Knoxville; Osman A. Basaran; Thomas G. Kollie, both of Oak Ridge; Fred J. Weaver, Knoxville, all of Tenn.

[73] Assignee: The United States of America as represented by the United States Department of Energy, Washington, D.C.

[21] Appl. No.: 298,719

[22] Filed: Aug. 31, 1994

Related U.S. Application Data

[62] Division of Ser. No. 237,083, May 3, 1994, Pat. No. 5,395,604, which is a division of Ser. No. 90,346, Jul. 9, 1993, Pat. No. 5,376,449.

[51] Int. Cl.$^6$ ........................................................ B32B 1/06
[52] U.S. Cl. ................................ 428/69; 428/76; 428/402
[58] Field of Search ................................... 423/335, 339, 423/338; 428/402, 69, 76

Primary Examiner—Alexander S. Thomas
Attorney, Agent, or Firm—David E. Breeden; Stephen D. Hamel; William R. Moser

[57] ABSTRACT

A powder evacuated thermal insulating panel using generally spherical and porous silica particles of a median size less than about 100 nanometers in diameter, a pour packing density of about 0.4 to 0.6 g/cm$^3$ and an external surface area in the range of about 90 to 600 m$^2$/g is described. The silica powders are prepared by reacting a tetraakyl silicate with ammonia and water in an alcohol solvent, distilling the solution after the reaction to remove the ammonia and recover the alcohol. The resulting aqueous slurry was dried, ball-milled, and dried again to provide the silica particles with defined internal and external porosity. The nanometer size and the large external surface area of the silica particles along with the internal and external porosity of the silica particles provide powder evacuated thermal insulating panels with significantly higher R-values than obtainable using previously known silica powders.

4 Claims, 1 Drawing Sheet

SILICA POWDERS FOR POWDER EVACUATED THERMAL INSULATING PANEL AND METHOD

This application is a division of application Ser. No. 08/237,083, filed May 5, 1994, now U.S. Pat. No. 5,395,604 which is a division of pending application Ser. No. 08/090, 346, filed Jul. 9, 1993 now U.S. Pat. No. 5,376,449. The present invention is directed to ultra fine silica powders that are particularly suitable for use in powder evacuated thermal insulating panels, the method for making the silica powders, and the evacuated thermal insulating panels containing such silica powders. This invention was made with the support of the United States Government under contract No. DE-AC05-84OR21400 awarded by the U.S. Department of Energy. The United States Government has certain rights in this invention.

BACKGROUND OF THE INVENTION

The replacement of polymeric foam insulators using carbon fluorocarbons (CFC's) as the foaming agent and commonly utilized for thermal insulation in doors and walls of refrigerators, freezers, and the like, is becoming of increasing importance from an environmental standpoint due to the deleterious impact CFC's have upon the ozone layer protecting the earth from dangerous levels of ultraviolet radiation. Recent efforts in this task involve the formation of the so-called powder evacuated thermal insulating panels which are formed by enclosing thermal insulating powders in an evacuated, substantially gas impervious envelope and placing the envelope within a suitably configured support panel. An example of such a powder evacuated panel and the thermal insulating powders used therein is described in U.S. Pat. No. 4,636,415. In this patent, precipitated silica powders formed by the interaction of an alkali water grass and a mineral acid followed by spray drying and milling are confined in an evacuated envelope and the powders then compressed to a desired density to form a relatively rigid, board-like structure for placement in the insulating panel. Another recent development in powder evacuated panels is described in U.S. Pat. No. 4,681,788 and involves the blending of precipitated silica such as set forth in U.S. Pat. No. 4,636,415 or other commercially available precipitated silica powders with fly-ash. This blend of precipitated silica and fly-ash is less expensive than that of precipitated silica alone and is formed into board-like thermal insulating structures for use in thermal insulating panels in a manner similar to that described above. These patents are incorporated herein by reference.

While the precipitated silica powder used alone or blended with fly-ash as described in the aforementioned patents provides satisfactory thermal insulating properties when used in powder evacuated thermal insulating panels, it was found that these precipitated silica powders were essentially non-porous so that thermal conduction through each solid particle detracted from the thermal insulating properties of the powder. Also, it was found that by compacting the precipitated silica or the blend of silica and fly-ash to densities greater than about .018 g/cm$^3$ resulted in significant solid-solid (particle-particle contact) which increased thermal conduction and thereby decreased the R-value of the thermal insulation.

Recent investigations have shown that the morphology of powders used in powder evacuated thermal insulating panels has a significant impact on the extent of thermal insulation provided by these panels. This level of thermal insulation is commonly expressed as thermal resistivity or R-values in Btu-in/Hr-Ft$^{2\circ}$ F.

SUMMARY OF THE INVENTION

Accordingly, it is a principal aim or objective of the present invention to provide silica particles or powders which possess a surface and interior morphology that significantly improves the thermal insulating properties thereof over the thermal insulating properties provided by previously known silica and other solid insulating powders such as described in the aforementioned patents when employed in powder evacuated thermal insulating panels. The silica particles of the present invention are characterized by being of a median size less than about 100 nanometers in diameter, by being of a substantially spherical configuration so as to minimize particle-to-particle contact, a pour packing density of about 0.4 to 0.6 g/cm$^3$, a high level of internal and external porosity which reduces solid-solid contact within the particles, and an external surface area greater than about 90 m$^2$/g. Also, the internal porosity of these silica particles is defined by micro-pores that are of a size sufficiently small so as to substantially reduce motion of gas molecules within these pores and thereby inhibit thermal conduction by the collision of gas molecules within the pores in the particles.

Another object of the present invention is to provide powder evacuated thermal insulating panels or assemblies employing an evacuated envelope containing such silica powders at a pour density of about 0.4 to 0.6 g/cm$^3$ for providing substantially greater R-values at absolute pressures less than 5 mm of mercury (Hg) than attainable by using previously known solid powders such as precipitated silica powders described in the aforementioned patents.

Another object of the present invention is to provide for the manufacture of such silica powders by reacting tetraakyl silicate with ammonia and water in an alcohol solvent. The particular tetraakyl silicate, the concentration of ammonia, and the particular alcohol solvent in the reaction solution is preselected to produce porous silica particles of a maximum median diameter of less than about 100 nanometers. The so-produced silica particles are subjected to post-forming steps which define and maintain the internal and external porosity in the silica particles as well as providing for the relatively high pour packing densities achievable by these silica particles, with such pour densities being adequate for use in thermal insulating panels without requiring further compaction.

Other and further objects of the present invention will become obvious upon an understanding of the illustrative embodiment and method about to be described or will be indicated in the appended claims, and various advantages not referred to herein will occur to one skilled in the art upon employment of the invention in practice.

Figure 1:
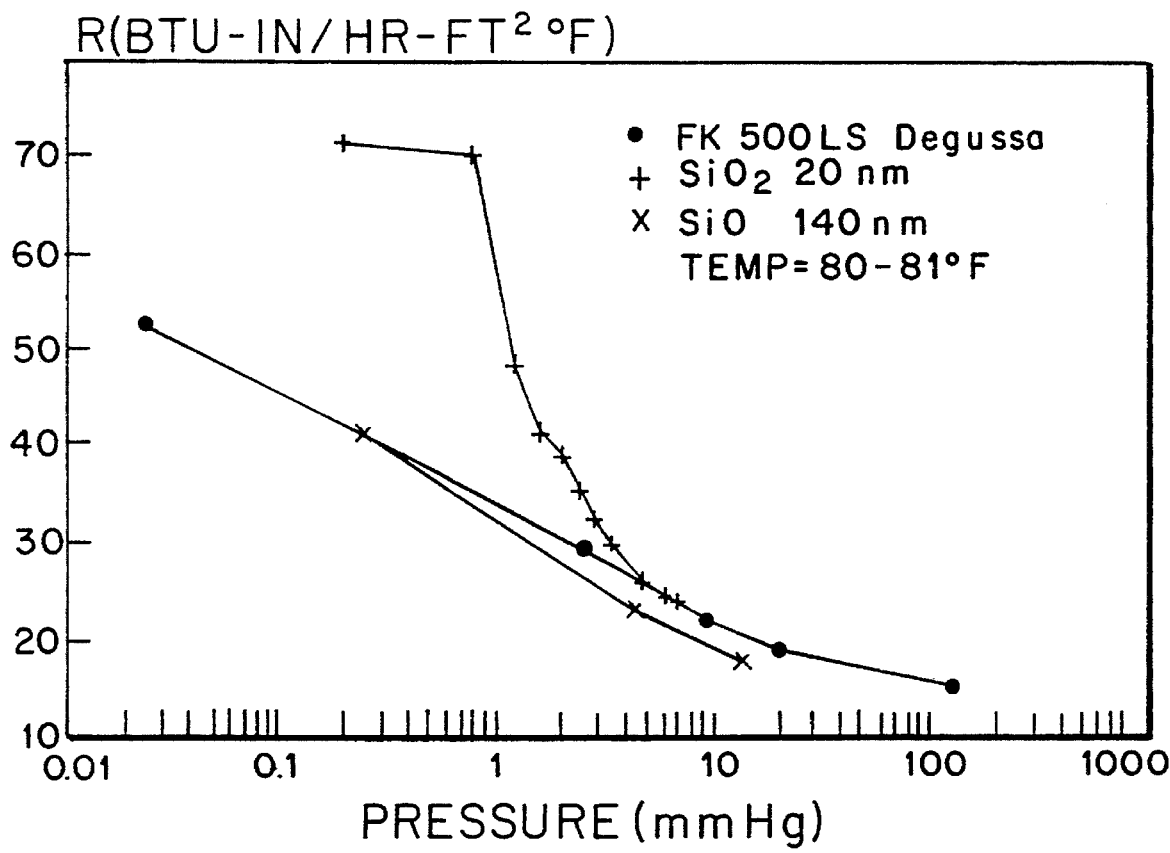
FIG. 1 is a graph comparing the thermal recessitivity of porous silica powder of a median particle size of less than 100 nanometers as prepared by the method of the present invention with previously known precipitated silica powders and with porous spherical powders as prepared by the method of the present invention but of a median particle size greater than 100 nanometers.

A preferred embodiment of the invention has been chosen for the purpose of illustration and description. The preferred embodiment illustrated is not intended to be exhaustive nor to limit the invention to the precise form shown. The preferred embodiment is chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE PRESENT INVENTION

As generally described above, the present invention is directed to ultra fine substantially spherical silica powder for use in powder evacuated insulation panels, with this silica powder consisting essentially of porous substantially spherical silica particles of a median size less than about 100 nanometers in diameter and formed of an agglomeration of silica particulates each of a diameter less than about 10 nanometers. These porous silica particles have internal pores sufficiently small to substantially restrict motion of gas molecules therein, are capable of a pour density of about 0.4 to about 0.6 gm/cm$^3$, and have an external surface area greater than about 90 m$^2$/g and in the range of about 90 to 600 m$^2$/g, preferably in a range of about 400 m$^2$/g.

The ultrafine silica particles suitable for use in powder evacuated thermal insulation panels are prepared by the steps comprising: reacting a tetraalkyl silicate with a sufficient concentration of ammonia and water in the presence of an alcohol solvent for a sufficient duration to form, in solution, solid substantially spherical and porous silica particles of a median size less than 100 nanometers in diameter; distilling the solution to remove the ammonia and alcohol therefrom; drying the resulting aqueous slurry containing agglomerates of the silica particles; and milling the resulting dried agglomerates of silica particles for a sufficient duration to form discrete silica particles of a size less than 100 nanometers in diameter. Preferably, the silica particles are again dried after the milling step to remove any remaining water, including chemically bound water.

The manufacture of the silica powders envisioned by the present invention is achieved by a modification including post particle-forming steps of the silica particle growing procedure described in the publication entitled, "Controlled Growth of Monodisperse Silica Spheres in the Micron Size Range", by Werner Stober et al, Journal of Colloid and Interface Science, Volume 26 (1968), pp 62–69. In this publication the reagents used for forming the silica powders were tetraalky silicates, methyl or ethyl (technical grade or prepared by reacting silicone tetrachloride and an alcohol such as n-propyl, n-butyl, or n-pentyl) anhydrous (99.99% pure) ammonia, water, and a solvent of an alcohol such as methanol, ethanol, n-propanol, and n-butanol. A saturated alcoholic ammonia solution of the selected alcohol and water was prepared and the selected tetraalkyl silicate was added to the solution for initiation of the condensation, silica sphere forming, reaction with the water and ammonia. The ammonia provides a morphological catalyst for effecting the formation of the spherical particles in the solution. The reaction solution is stirred or agitated to maintain the silica spheres in suspension. The condensation reaction generally started within ten minutes of forming the reaction solution with the condensation of supersaturated silicic acid as indicated by an increasing opalescence of the mixtures one to five minutes after adding the tetraakyl silicate. After the initial phase, the transition to a turbid white suspension occurred regularly within a few minutes.

In this publication, tests of the spheres produced by the reactions were made after reaction periods of about two hours although some tests indicated that the silica particles sometimes reached their final size with a reaction period of about fifteen minutes. Also, it was determined that with the use of different alcohol solvents that the reaction rates were the fastest with methanol and slowest with the n-butanol. The sizes of the silica particles obtained under comparable conditions were smallest when methanol was used and largest when the n-butanol was used. In this publication it was noted that when comparing the results of using different alkyl silicates, the fastest reactions the smallest size of particles were formed with the tetramethyl ester while tetrapentyl ester reacted substantially slower and produced bigger particles. It was also noted that the generation of silica particles larger than one micron could not be effected with the ethanol-ethyl ester system, but required the use of esters of higher alcohols. Various tests with the tetraakyl esters under comparable additions showed that the condensation reaction slowed down with increasing molecular weight of the ester while at the same time producing silica particles of larger size with a fair degree of uniformity. The reaction could be slowed down by using higher alcohols as the solvents but that the median particle size and spread of the size distribution increased simultaneously with the slower reactions.

The tetraakyl esters used in the present invention may be any of the esters described in the aforementioned publication but is preferred to use the ethanolethyl ester or methanol-ethyl ester system since this system provides for better control of the particle size distribution and the production of silica particles of a median diameter of less than about 100 nanometers, as required of the silica powders of the present invention for providing the improved thermal insulating properties achieved thereby. In accordance with the present invention the preferred reagents for producing the porous spherical particles are: tetraethyl orthosilicate in a concentration in the range of about 1M to 1.5M; ammonia in concentration in the range of about 0.01M to 0.7M; water in a concentration in the range of about 2M to 6M; and the balance ethanol or methanol as the solvent. The reaction times for forming the silica particles of the preferred size range, as set forth above, is in the range of about 2 to 24 hours up to about 7 days. The longer reaction times have been shown to provide nanophase silica particles in the 10–20 nm size range when the reactions are conducted in ethanol.

The publication is not descriptive of any function of the silica powders prepared by the reactions described therein nor does it describe any morphology of the powder except for the particular sizes and the generally spherical configuration of the powders. However, in accordance with the present invention, it was discovered that by subjecting these silica powders to a series of treatments after the formation thereof that internal and external pores in these silica particles were defined and thereby provided these particles with a level of internal and external porosity which significantly reduces solid-solid conduction within the each particle. Additionally, the size of the internal pores in the particles were found to be sufficiently small that the motion of gas molecules within the pores was substantially restricted so as to prevent or substantially minimize thermal conduction by the collision of gas molecules within the pores. The silica particles of the desired particle size are formed by the agglomeration of relatively small silica particulates having a diameter in the range of about 1.0 to 10 nanometers. The resulting silica particles are referred to herein as macro-particles which term is descriptive of the formation thereof by the agglomeration of smaller particulates.

The post processing steps provided by the present invention on the silica powders involves distilling the solution after the formation of the silica powders therein to remove the ammonia and recover the alcohol. This distillation step forms an aqueous slurry containing an agglomeration of the silica macro-particles. The slurry is then dried in a vacuum oven at an absolute pressure in the range of about 125 to 150 mm mercury for a duration of about 12 to 36 hours to remove water, including chemical bound water, from the particles for defining the internal and external porosity therein. The dried particles are then milled for a duration of about 12 to 36 hours for breaking-up the agglomerates of the particles for providing individual silica macro-particles within the desired particle size range. This milling step may be achieved by using any suitable milling mechanism such as a conventional ball mill. After the milling operation the individual particles are then subjected to a further drying step at an absolute pressure in the range of about 125 to 15 mm mercury for a duration of about 12 to 36 hours to assure that any residual water is removed from the internal pores and thereby assuring that the porosity exists in the individual silica particles for effecting minimal thermal conduction while providing the thermal insulating advantages achieved by highly porous silica particles.

The diameter and the surface area of the silica particles prepared by the aforementioned reaction and the post reaction treating steps are of critical significance to the invention for providing silica particles having thermal recessivity values at absolute pressures less than about 5 mm Hg that are greater than provided by the precipitated silica powders described in the aforementioned patents at similar absolute pressures as well as silica particles prepared by the aforementioned reaction and the post reaction treatment but of a median particle size larger than about 100 nanometers and a surface area of less than 200 $m^2/g$. In a demonstration of these critical features, silica particles were prepared by reactions set forth in the examples below for showing the difference in properties of the silica particles prepared by these reactions. In each of these examples tetraethyl orthosilicate (TEOS) was reacted with ammonia and water in ethanol. The size of the silica particles was controlled by varying the ammonia and water concentrations with the control of the ammonia concentration providing the better mechanism for regulating the particle size.

EXAMPLE 1

In this example, 1M TEOS, 2.9M $H_2O$ and 0.7M $NH_3$ was used to produce silica particles in a size; range of 70 to 170 nm by reacting the solution for a duration of one week. After this solution was distilled to remove the ammonia and recover the ethanol, the slurry was dried in a vacuum oven with an absolute pressure of about 130 mm Hg. The dried silica solids were then removed from the vacuum oven and ball milled for 24 hours to break-up any agglomerates of the dried particulate solids. The powders were then again dried in a vacuum oven at an absolute pressure of about 130 mm Hg. The silica particles were in a size range of 70 to 170 nm with a median size of 140 nm, provided, a pour density of 0.64 $g/cm^3$, and possessed an external surface area of 60 $m^2/g$.

EXAMPLE 2

The same solution as used in Example 1 was used in this Example except that the concentration of ammonia was reduced to 0.057M ammonia. This solution was reacted for a similar period and subjected to the same post forming treatment as described in Example 1. In this reaction with the lower concentration of ammonia, silica macro-particles of a size in the range of 15 to 30 nm were provided, with a median diameter of 20 nm with these particles having had a pour density of 0.6 $g/cm^3$, and an external surface area of 400 $m^2/g$.

The comparison of the thermal recessitivity or R-value of a thermal insulating panel provided with silica macro-particles with a 140 nm median diameter as prepared by the solution used in Example 1 was made similar a panel provided with silica macro-particles having a median diameter of 20 nm as prepared by the preferred solution of Example 2. Also, included in this comparison of thermal recessitivity was a similar panel provided with precipitated silica powder commercially available from Degussa under the designation of FK500-LS as described in Example 1 of the aforementioned U.S. Pat. No. 4,636,415. This comparison of the R-values for these silica powders is illustrated in the graph of FIG. 1 with the silica powders subjected to various absolute pressures at an ambient temperature of 80–81° F. As clearly shown in this graph, the powder evacuated panel with the silica particles of the 20 nm size demonstrated a significant increase in R-values over that provided by the panels containing the larger 140 nm silica particles and the previously known precipitated silica powders at decreasing absolute pressures starting at about 5 mm Hg. This increase in R-values rises significantly with decreasing pressure so that when the pressure is reduced to about 1 mm Hg, the R-values of the powder evacuated panel with the 20 nm silica particles are at least 50 percent greater than the R-values provided by panels with the larger silica particles and the previously known precipitated silica powders.

The marked difference in the thermal recessitivity of the silica powders of a median diameter less than 100 nm is due to the smaller internal pores and the substantially larger external surface area provided by the silica powders of less than 100 nm with such surface area being at least about 90 $m^2/g$, preferably in a range of about 90 to 600 $m^2/g$, and more preferably about 400 $m^2/g$.

Figure 2:
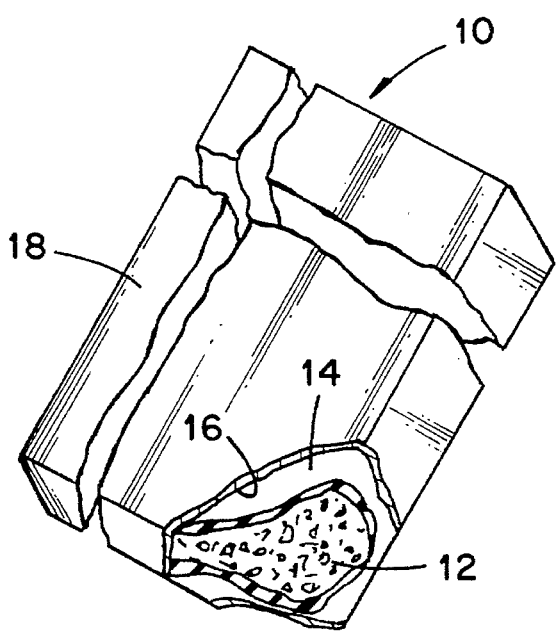
FIG. 2 is a perspective view, partly broken away, of a powder evacuated thermal insulating panel employing silica powders prepared in accordance with the present invention.

In the utilization of the silica powders of the preferred size as provided by the reaction in Example 2 in a powder evacuated thermal insulating panel as generally shown at 10 in FIG. 2, the silica powders 12 of a median diameter less than 100 nm are encased within the envelope 14 formed of a suitable, essentially gas impervious elastomeric material such as described in the aforementioned patents. The envelope 14 is then sealed and evacuated to a suitable absolute pressure, preferably less than about 5 mm Hg so that the full benefit of the thermal insulating properties provided by the present invention can be realized. The evacuated powder-containing envelope is then placed in cavity 16 within the housing 18 defined by the panel 10. During the placement of the silica particles 12 within the envelope 14, the silica particles are packed at a pour density of about 0.4 to 0.6 $g/cm^3$, which density is significant greater than the pour densities obtainable with the precipitated silica powders described in the aforementioned patents and which is also more desirable since these previously known silica powders suffered a significant loss in thermal recessitivity when the powders were packed to a density greater than 0.18 $cm^3/g$.

The range of diameters for the silica macro-particles found to be suitable for thermal insulating applications is about 15 to about 100 nanometers, preferably about 20 nanometers. The median particle size using the preferred reagents and concentrations thereof is readily controlled within this range by varying the concentration of the ammonia. Also, the particle size distribution of the particles of the selected median size is such that only about 5% of the particles differ from the median particle size by more than about 50%.

It will be seen that the present invention provides for the synthesis and post processing of ultrafine silica particles suitable for use in powder evacuated thermal insulating panels with these silica particles providing such panels with substantially higher R-values than obtainable with previously known silica powders. In fact, the silica powders of the present invention employed in the evacuated panels provided the resulting panels with R-values at absolute pressures less than about 5 mm Hg that are at least 50% greater than that of such panels using previously known silica powders.

What is claimed is:

1. A powder evacuated thermal insulation panel comprising housing means having a cavity therein, an enclosed substantially gas impervious envelope means disposed within the cavity of the housing means, and porous substantially spherical silica particles encased within the enclosed envelope means in the presence of an ambient pressure substantially less than atmospheric pressure, said silica particles having a median diameter of less than about 100 nanometers, an internal porosity sufficiently small to significantly restrict motion of gas molecules therein for substantially preventing thermal conduction by collision of gas molecules within the silica particles, an external surface area in the range of about 90 to 600 $m^2/g$, and a pour density of about 0.4 to 0.6 $g/cm^3$.

2. A thermal insulation panel as claimed in claim 1, wherein the ambient pressure substantially less than atmospheric pressure is a pressure corresponding to less than about 5 mm mercury.

3. A thermal insulation panel as claimed in claim wherein the median diameter of the silica particles is in the range of about 15 to 100 nanometers in diameter.

4. A thermal insulation panel as claimed in claim 1, wherein the silica particles are of a median diameter of about 20 nanometers, wherein the silica particles have an external surface area of about 400 $m^2/g$, and wherein the silica particles have a pour density of about 0.6 $g/cm^3$.

* * * * *